United States Patent [19]

Mayer et al.

[11] Patent Number: 5,393,619

[45] Date of Patent: Feb. 28, 1995

[54] CELL SEPARATOR FOR USE IN BIPOLAR-STACK ENERGY STORAGE DEVICES

[75] Inventors: Steven T. Mayer, San Leandro; John H. Feikert, Livermore; James L. Kachmitter, Pleasanton; Richard W. Pekala, Pleasant Hill, all of Calif.

[73] Assignee: Regents of the University of California, Oakland, Calif.

[21] Appl. No.: 229,239

[22] Filed: Apr. 18, 1994

Related U.S. Application Data

[62] Division of Ser. No. 90,881, Jul. 8, 1993, Pat. No. 5,336,274.

[51] Int. Cl.[6] .................... H01M 6/46; H01M 2/16; H01G 9/00
[52] U.S. Cl. .................... 429/152; 429/44; 429/253; 361/502
[58] Field of Search ................ 429/152, 253, 249, 149, 429/153, 18, 44; 361/502, 512

[56] References Cited

U.S. PATENT DOCUMENTS 4,389,470  6/1983  Plasse .................................. 429/152
5,260,855  11/1993  Kaschmitter et al. ............. 361/502

Primary Examiner—John S. Maples
Attorney, Agent, or Firm—Henry P. Sartorio; L. E. Carnahan

[57] ABSTRACT

An improved multi-cell electrochemical energy storage device, such as a battery, fuel cell, or double layer capacitor using a cell separator which allows cells to be stacked and interconnected with low electrical resistance and high reliability while maximizing packaging efficiency. By adding repeating cells, higher voltages can be obtained. The cell separator is formed by applying an organic adhesive on opposing surfaces of adjacent carbon electrodes or surfaces of aerogel electrodes of a pair of adjacent cells prior to or after pyrolysis thereof to form carbon aerogel electrodes. The cell separator is electronically conductive, but ionically isolating, preventing an electrolytic conduction path between adjacent cells in the stack.

19 Claims, 1 Drawing Sheet

CELL SEPARATOR FOR USE IN BIPOLAR-STACK ENERGY STORAGE DEVICES

The United States Government has rights in this invention pursuant to Contract No. W-7405-ENG-48 between the United States Department of Energy and the University of California for the operation of Lawrence Livermore National Laboratory.

This is a division of application Ser. No. 08/090,881, filed Jul. 8, 1993, now U.S. Pat. No. 5,336,274.

BACKGROUND OF THE INVENTION

The present invention relates to energy storage devices using cell separators, particularly to a separator between stacked energy storage cells using carbon electrodes, and more particularly to an improved multi-cell energy storage device using a cell separator for interconnecting cells containing carbon foam electrodes, whereby the electrodes of adjacent cells are interconnected by a separator composed of a layer of electrically conductive, but ionically isolating material.

Many applications of batteries, fuel cells, and capacitors, such as electric vehicles, medical, etc., require higher voltages than those achieved with a single cell. Using multiple, individually interconnected packaged cells is not desirable because it increases the weight, decreases volumetric packing efficiency, increases costs, and can potentially lead to higher resistances.

Prior efforts have been directed to using multiple cells interconnected and packaged for use in higher voltage energy storage devices, including batteries, electrochemical double-layer capacitors, and fuel cells. For example, double-layer capacitors are well known energy storage devices, see Vols. 1 and 2 of the conference proceedings of "An International Seminar on Double Layer Capacitors and Similar Energy Storage Devices", December 1991 and December 1992. More recently single and multi-cell capacitors have been developed using carbon foam electrodes, as described and claimed in copending U.S. application Ser. No. 07/822,438, filed Jan. 17, 1992, now U.S. Pat. No. 5,260,855, issued Nov. 9, 1993 entitled "Supercapacitors Based on Carbon Foams", which allows individual cells to be stacked and interconnected with low electrical resistance and high reliability, while improving packaging efficiency. This is accomplished through the use of cell separators.

Critical requirements for cell separators include long life, low material cost, tolerance to a wide variety of electrolytes, low electrical resistance, and ionic isolation. The cell separators suitable for use in the multi-cell energy storage devices of above-referenced U.S. application Ser. No. 07/822,438, consisted of metals, conductive rubbers or plastics, non-porous carbon or metalplastic composites. While these cell separators must be highly electrically conductive and stable chemically with respect to the electrolytes used, while preventing ionic flow but permitting electrical conduction between the cells, it is preferably that the separators be lightweight and have low density to minimize its weight contribution to the energy storage devices.

While the cell separators utilized in the energy storage devices of above-referenced U.S. application Ser. No. 07/822,438, satisfies the above-listed critical requirements, there exists a need to further maximize packaging efficiency and further reduce the costs of multi-cell assembly while meeting these critical requirements. It has been discovered that by interconnecting carbon electrodes of adjacent cells using an appropriate adhesive or paste, a plurality of individual cell units can be connected to form a bipolar-stack energy storage device. Initial testing has established that the above-referenced critical requirements have been satisfied while the construction of cell separators for multiple-cell energy storage devices has been greatly simplified. This has been accomplished by a methodology for interconnecting adjacent carbon foam electrodes, which enables stacking of repeating cells to achieve higher voltages for energy storage applications. Thus this invention comprises an improvement over cell separators of the multi-cell energy storage devices of the above-reference patent application.

SUMMARY OF THE INVENTION

The object of the present invention is to provide a cell separator for use in bipolar-stack energy storage devices.

A further object of the invention is to provide an improved multi-cell energy storage device.

A further object of the invention is to provide a technique for interconnecting a plurality of electrochemical cells using carbon foam electrodes.

A further object of the invention is to provide a technique for interconnecting a plurality of electrochemical cells using carbon foam electrodes via a carbonizable or pyrolyzable material such as modified alkyd, furfuryl alcohol, furfural, or phenolic resins.

A further object of the invention is to provide a methodology for interconnecting carbon electrodes which are stacked in repeating cells.

Another object of the invention is to provide a means for interconnecting a variety of carbon foams, porous carbon composites, and thin films of carbon microspheres.

Another object of the invention is to provide a means for interconnecting cells using carbon foam electrodes using a low cost carbonizable or pyrolyzable, organic adhesive or paste to interconnect aerogel electrodes prior to or after pyrolysis to form carbon foam electrodes.

Another object of the invention is to provide a cell separator between at least a pair of energy storage cells, each being composed of a plurality of separated aerogel electrodes, by interconnecting adjacent electrodes of the individual cells.

Another object of the invention is to interconnect adjacent energy storage cells by depositing an appropriate adhesive on opposing surfaces of the electrodes of adjacent cells.

Other objects and advantages of the invention will become apparent from the following description and accompanying drawings. Basically the invention is a methodology or technique for interconnecting carbon electrodes, which are stacked in repeating cells, to achieve higher voltages for energy storage applications. This technique can be applied to cell electrodes formed from a variety of carbon foams, porous carbon composites, and thin film formed from carbon microspheres. The type and structure of carbon used in the electrodes is dependent on the application, but this technique could be used in fuel cells, or electrochemical double-layer capacitors, or batteries which use foams or carbon composites as electrodes. More specifically, the invention involves depositing an appropriate adhesive material on opposing surfaces of two electrodes of adjacent energy cells in a stack to form a cell separator which is electronically conductive, but ionically isolating, for preventing an electrolytic conductive path between adjacent cells in the stake. The cell separator must be chemically resistant to the electrolyte used in the cell. Also, when used to interconnect cells using carbon foam electrodes, the material forming the cell separator can be applied prior to the step of pyrolysis of the aerogel electrodes, and must be capable of withstanding the temperature of pyrolysis and shrinks during pyrolysis at a rate similar to the shrinkage rate of the aerogel. By way of example, where the electrodes have not been previously pyrolyzed to form carbon foam electrodes, the adhesive material used to form the cell separator may be a modified alkyd resin (e.g. GLYPTAL 1202, made by General Electric Co.) which is a low cost, pyrolyzable or carbonizable, organic paste; and where the electrodes have been previously carbonized the adhesive material may be a modified furfuryl alcohol, furfural, or phenolic resin (e.g. FURCARB UP520, made by QO Chemicals Inc.).

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The present invention is directed to an improved multi-cell electrochemical energy storage device which incorporates a simplified cell separator. The cell separator of this invention has low electrical resistance, ionic isolation, tolerance with a wide variety of electrolytes, and which is constructed in the form of a thin-film of low cost material which can be deposited by a variety of low cost techniques. The cell separator can be produced from any adhesive-type organic material which is carbonizable and leaves a nonporous char, and may be a single compound or mixture of more than one compound. Thus, the term "adhesive material" used hereinafter has these qualifications. More specifically the invention is directed to a bipolar-stack energy storage device, such as a battery, fuel cell, or electrochemical double-layer capacitor (supercapacitor), and is composed of a plurality of cells using carbon electrodes, with the adjacent electrodes being directly connected via a cell separator. Thus, this invention constitutes an improvement over the energy storage device of above-referenced U.S. application Ser. No. 07/822,438, by providing a simplified thin-film cell separator which enables direct interconnection of the adjacent carbon foam electrodes of adjacent cells in a stack.

Figure 1:
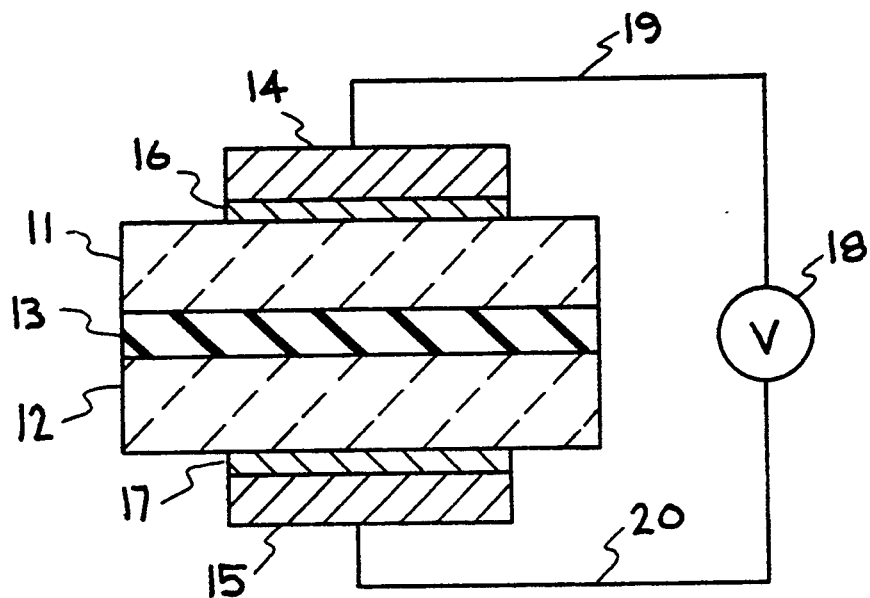
FIG. 1 illustrates cross-sectional view of an embodiment of single cell energy storage device.

FIG. 1 illustrates a single cell energy storage device such as a capacitor, indicated generally at 10 and which is generally similar in construction to the single cell of above-referenced U.S. application Ser. No. 07/822,438. The cell 10 is composed of a pair of carbon aerogel electrodes 11 and 12 with an electrode separator 13 therebetween. The electrodes 11 and 12 are provided with electrical contact pads 14 and 15 via conductive adhesive layers 16 and 17 respectively. However, the contact pads and the adhesive layers may be an integral (single) component. The contact pads 14 and 15 are connected to a voltage source 18 via leads or lines 19 and 20, respectively. The overall height or thickness of cell 10 is about 0.5-30 mils, preferably 0.5-5 mils. For example with the cell 10 having a height of 15 mils, electrodes 11 and 12 a thickness of 5 mils, electrode separator having a width of 1 mil, contact pads 14 and 15 each having a width of 1 mil, and adhesive layers 16 and 17 each having a width of 1 mil. However, the thickness of each of these components may be greater or smaller depending of the chemical and physical composition thereof to withstand the temperatures, imposed thereon.

Figure 2:
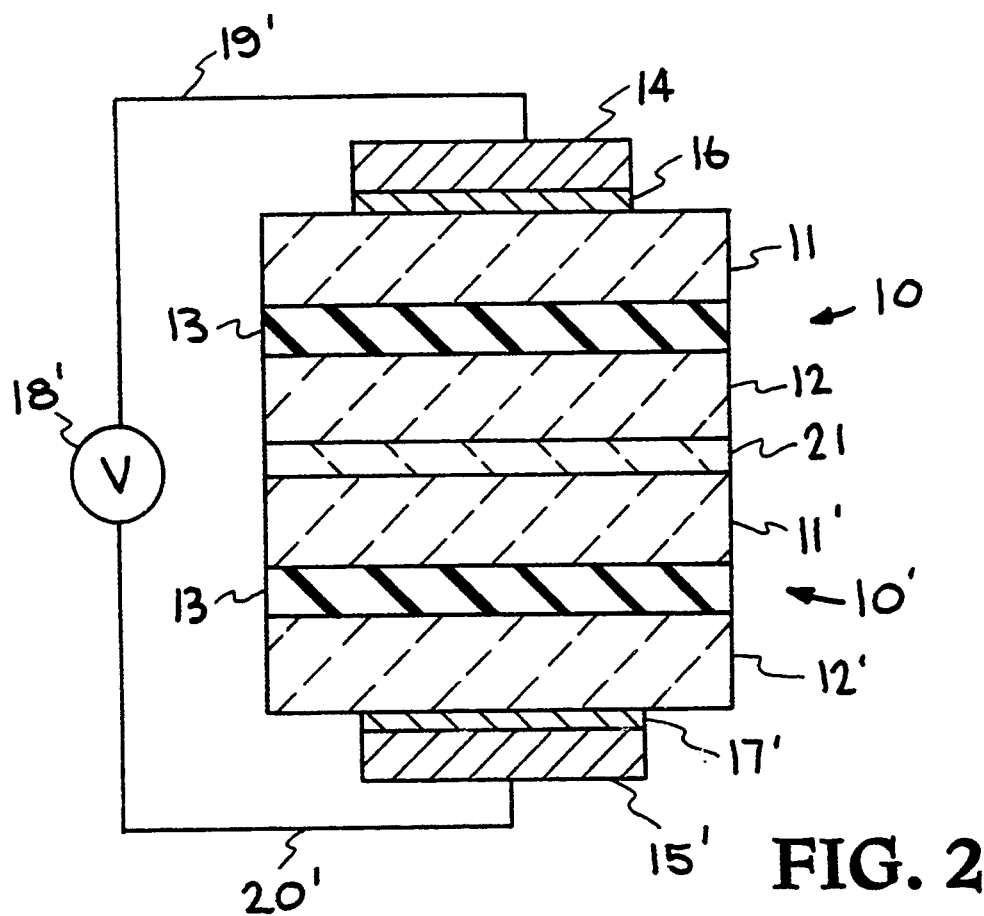
FIG. 2 illustrates in cross-section an embodiment of a multi-cell energy storage device, made in accordance with the present invention using a layer of appropriate adhesive material as a cell separator.

FIG. 2 illustrates a multi-cell energy storage device composed of a stack of identical single cells interconnected by a thin-film cell separator. As seen in FIG. 2 each single cell, generally indicated at 10 and 10' forms a capacitor, for example, composed of two carbon aerogel electrodes 11, 11' and 12, 12' separated by an electrode separator 13, 13' constructed of an electrically non-conductive, ionically conductive material or composite. The cells 10 and 10' would be immersed in an electrolyte, not shown, with the outer carbon electrode of each single cell being electrically connected via electrode contact pads 14, 15' and conductive adhesive layers 16, 17' to a voltage source 18' via lines or leads 19' and 20'. A wide variety of organic and inorganic electrolytes may be used. The contact pads and the conductive adhesive layers may be formed as a single component, if desired. A thin-film cell separator 21 is formed, for example, by depositing a layer or coating of an adhesive material on opposing surfaces of the adjacent carbon electrodes (12 of cell 10 and electrode 11' of cell 10'), and the electrodes pressed together. The cell separator 21 is formed, for example, by depositing a low cost, carbonizable or pyrolyzable, organic paste or adhesive on opposing surfaces of two aligned carbon electrodes of adjacent cells. The carbon electrodes may be composed of carbon foams, porous carbon composites and thin layers or films of carbon microspheres with a binder. Where the electrodes are carbon foam, such as made from resorcinol/formaldehyde aerogels, as described in above-referenced U.S. application Ser. No. 07/822,438, an adhesive, such as a modified alkyd resin (GLYPTAL 1202) could be deposited thereon prior to pyrolysis of the aerogel. Where these electrodes have been previously carbonized or pyrolyzed, the adhesive could be a modified furfural resin (Furcarb UP520), for example. Modified alkyd resins are commercially available as insulating synthetic-resin and finishing varnishes, which are resistant to oils, moisture and acids, and can be used as an adhesive. The properties of these resins are such that they form a non-porous thin-film that shrinks during pyrolysis at a nominally similar rate to the aerogel. Modified alkyd resins can be fired at the temperatures (500°-3000° C.) necessary for pyrolyzing the carbon foams. Appropriate deposition techniques include spreading by brush, spraying, dipping, squeegee, or roller, or other low cost, mass produceable methods. Where the adhesive is a modified furfural resin, such would be applied by these same deposition techniques, after which the electrodes are pressed together and then fired to carbonize the adhesive.

In experimental verification, GLYPTAL 1202 was spread in a thin film, approximately 0.5 mils thick, on one side of each of two RF aerogel electrodes. These electrodes were then aligned and pressed together and the complete assembly was then fired at 1050° C. for 4 hours in an inert atmosphere. This electrode assembly was then assembled with other cell components to make a working two cell capacitor. The resultant assembly contained two carbon aerogel foam electrodes, such as 11' and 12, with an integral cell separator 21 therebetween. The cell separator 21 is electronically conductive, but ionically isolating, preventing an electrolytic conductive path between adjacent cells 10 and 10' in the stack. When electronically insulating and ionically conductive electrode separators are placed between the aerogel electrodes, a single cell capacitor 10 or 10' is formed as shown in FIG. 1. By adding repeating cells, as shown in the drawing, interconnected by a cell separator 21, as described above, higher voltages can be obtained. Tests established that each cell can be charged to a maximum of 1.2 volts for typical aqueous electrolytes (e.g. KOH and $H_2SO_4$), or more than 3.0 volts for some organic electrolytes.

Experimental verification of the modified furfural resin (e.g. FURCARB UP520) was carried out by a process similar to that described above except that the adhesive was applied to previously carbonized aerogels and then refired in an inert atmosphere to carbonize the adhesive (4 hrs @ 1050° C.). Tests verified the increase in cell voltage by stacking the individual cells 10.

This type of cell separator can be formed on any type of carbon material, including all types of carbon foams and porous carbon composites formed by pressing carbon powders with binders under heat and pressure. This cell separator can also be used with loosely bound carbon powders and carbon aerogel microspheres, but must be electrically conductive and ionically non-conductive. By Way of example, the cell separator may have a thickness in the range of $2.5\mu$ to 10 mils.

The carbon electrodes 11, 11' and 12, 12' of cells 10 and 10' may be composed of or include carbon aerogel, xerogel, or hybrid aerogel-xerogel foams, such as those described in above referenced U.S. application Ser. No. 07/822,438, or carbon foams fabricated by the process described and claimed in copending U.S. application Ser. No. 08/041,503, filed Apr. 1, 1993, and entitled "Method of Low Pressure and/or Evaporative Drying of Aerogel", or fabricated from carbon aerogel foam microspheres, such as described and claimed in copending U.S. application Ser. No. 08/089,119, filed Jul. 8, 1993, and entitled "Organic Aerogel Microspheres and Fabrication Method Therefor". Also, the electrode separators 13, 13' may be fabricated from porous films of commercially known material such as polypropylene, TEFLON (made by the DuPont Company), nylon, and glass fiber filter papers, or from an aquagel containing potassium hydroxide, for example, as described and claimed in copending U.S. application Ser. No. 08/057,739, filed May 4, 1993, and entitled "An Aquagel Electrode Separator for Use in Batteries and Supercapacitors".

The electrodes 11, 11' and 12, 12' may also be fabricated from thin film aerogel composites. The fabrication of such thin film aerogel composites can be accomplished by infiltration of highly porous carbon papers, membranes, felts, or fabrics with a resorcinol-formaldehyde (RF) sol. The RF sol is prepared by mixing 12.35 g resorcinol and 17.91 g formaldehyde (37% solution) at room temperature until a clear solution is formed. Next 5.58 g 0.1M sodium carbonate is added to the mixture, which is then heated at 50° C. for 10 minutes to form the RF sol. We have demonstrated that the RF sol (60% w/v) can be infiltrated into a 125 $\mu$m thick carbon paper (Textron C.05; ~0.15 g/cc), dried, and pyrolyzed at 1050° C. into a fiber reinforced carbon aerogel composite. This material has high surface (>500 $m^2/g$), a density of 0.5 g/cc, and a capacitance of ~20 F/cc when used as an electrode in an aqueous-based (4M KOH) supercapacitor.

While the embodiment illustrated and described above contains two cells, any additional number of corresponding cells may be added by merely interconnecting adjacent carbon electrodes of the adjacent cells by cell separators as described above. If the electrodes of the desired multi-cell assembly are made of carbon foams, the formation of each of the cell separators may be carried out prior to or after the pyrolization of the aerogel foams, as described above. Also, the above description is directed to the use of modified alkyd or furfural resins as the adhesive or paste from which the cell separators are formed but other adhesive materials may be used provided such satisfies the critical requirements for cell separators, and when used with carbon foam electrodes are compatible with the pyrolyzing temperatures and material shrinkage characteristics. The thickness of the thin-film cell separators will also depend on the type of carbon electrodes, size, etc. In addition, the cell separator may be used in energy storage devices wherein only one of the two electrodes is made of carbon.

While a specific embodiment of a multi-cell assembly has been illustrated and described, a specific material, thickness, time, and temperature for forming the cell separator have been set forth, and the invention described as a capacitor, such is not intended to so limit the invention. Modifications and changes in the formation of the thin-film cell separator will become apparent, and the multi-cell may be used in other energy storage devices, such as batteries or fuel cells. Thus, the invention or its use should not be limited other than by the scope of the appended claims.

We claim:

1. In an energy storage device having at least two cells, with each cell having at least one carbon electrode, the improvement comprising:
   a cell separator composed of an adhesive material located between and secured to opposing surfaces of adjacent carbon electrodes of each adjacent cell, said cell separator providing electrical connectivity, but ionic isolation between the adjacent cells.

2. The improvement of claim 1, wherein said adhesive material comprises a thin-film applied to the opposing surfaces of said adjacent carbon electrodes.

3. The improvement of claim 1, wherein said adhesive material is a carbonizable, organic resin.

4. The improvement of claim 1, wherein said adhesive material is selected from the group consisting of modified alkyd, furfural, furfuryl alcohol, and phenolic resins.

5. The improvement of claim 1, wherein said carbon electrode is composed of an aerogel, aerogel composite, xerogel or aerogel-xerogel carbon foam.

6. A multi-cell electrochemical energy storage device, comprising:
   a plurality of cells, each cell comprising:
      a first electrode comprising a conductive material,
      a second electrode comprising a carbon electrode, and an electrode separator disposed between said electrodes and comprising an electrically non-conductive, ionically conductive material; and a thin-film cell separator located between adjacent cells, said cell separator being electronically conductive and ionically non-conductive and formed from an adhesive material deposited on adjacent surfaces of said second electrodes of said cells.

7. The multi-cell energy storage device of claim 6, wherein said carbon electrodes are formed from aerogel, aerogel composite, xerogel, or aerogel-xerogel carbon foams.

8. The multi-cell energy storage device of claim 6, wherein said first electrode comprises a carbon foam.

9. The multi-cell energy storage device of claim 6, wherein said adhesive material is carbonizable and organic, and capable of withstanding a pyrolyzing temperature of 500°–3000° C.

10. The multi-cell energy storage device of claim 6, wherein said thin-film cell separator is formed by depositing a layer of the adhesive material on the adjacent surfaces of said electrodes prior to pyrolyzing said electrodes to form carbon foam.

11. The multi-cell energy storage device of claim 6, wherein said thin-film cell separator is formed by depositing a layer of the adhesive material on the adjacent surfaces of said electrodes after pyrolyzing said electrodes to form carbon foam.

12. The multi-cell energy storage device of claim 10, wherein each of said electrodes in each of said plurality of cells are constructed of a carbon foam.

13. The multi-cell energy storage device of claim 7, wherein at least one of said electrodes is formed from an aerogel composite.

14. The multi-cell energy storage device of claim 13, wherein said aerogel composite electrode is formed by infiltration of highly porous carbon papers, membranes, felts, or fabrics with a resorcinol-formaldehyde sol.

15. The multi-cell energy storage device of claim 14, wherein the resorcinol-formaldehyde sol is prepared by the steps of:

mixing resorcinol and formaldehyde at room temperature until a clear solution is formed, adding 0.1M sodium carbonate to the thus formed solution, and heating the solution at 50° C. for a time period to form the resorcinol-formaldehyde sol.

16. The multi-cell energy storage device of claim 15, wherein the step of mixing the resorcinol and the formaldehyde is carried out by mixing 12.35 grams of resorcinol and 17.91 grams of 37% formaldehyde, and wherein 5.58 grams of sodium carbonate is added to the resorcinol-formaldehyde solution, and wherein the step of heating is carried out for a time period of 10 minutes.

17. The multi-cell energy storage device of claim, 15, wherein aerogel composite electrode is formed by infiltrating the resorcinol-formaldehyde sol into carbon paper, drying, and pyrolyzing to form a fiber reinforced carbon aerogel composite.

18. The multi-cell energy storage device of claim 17, wherein the infiltrating of the resorcinol-formaldehyde sol is carried out using 60% w/v of resorcinol-formaldehyde sol and 125 $\mu$m thick carbon paper having a density of about 0.15 g/cc.

19. The multi-cell energy storage device of claim 18, wherein the fiber reinforced carbon aerogel composite has a surface area of $>500$ m$^2$/g, a density of 0.5 g/cc, and a capacitance of about 20 F/cc when used in an aqueous-based electrode.

* * * * *